(12) United States Patent
Kwatra et al.

(10) Patent No.: US 10,547,582 B1
(45) Date of Patent: Jan. 28, 2020

(54) METHODS AND SYSTEMS FOR ENHANCING VIEWER ENGAGEMENT WITH CONTENT PORTIONS

(71) Applicant: INTERNATIONAL BUSINESS MACHINES CORPORATION, Armonk, NY (US)

(72) Inventors: Shikhar Kwatra, Morrisville, NC (US); John D. Wilson, League City, TX (US); Paul Krystek, Highland, NY (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/128,498

(22) Filed: Sep. 11, 2018

(51) Int. Cl.
  *G06F 17/27* (2006.01)
  *H04L 12/58* (2006.01)
  *G06Q 50/00* (2012.01)
  *G06K 9/00* (2006.01)
  *G06F 16/958* (2019.01)

(52) U.S. Cl.
  CPC ............ *H04L 51/32* (2013.01); *G06F 16/958* (2019.01); *G06F 17/2785* (2013.01); *G06K 9/00718* (2013.01); *G06Q 50/01* (2013.01); *H04L 51/18* (2013.01)

(58) Field of Classification Search
  None
  See application file for complete search history.

(56) References Cited

U.S. PATENT DOCUMENTS

| | | |
|---|---|---|
| 9,966,112 B1 | 5/2018 | Kulkarni et al. |
| 2012/0330968 A1 | 12/2012 | Lee et al. |
| 2014/0380199 A1* | 12/2014 | Vasudevan .......... G06F 16/9577 715/760 |
| 2015/0025950 A1* | 1/2015 | Yu ...................... G06Q 30/0274 705/14.7 |
| 2016/0330526 A1* | 11/2016 | Marchetti .............. G06Q 30/00 |
| 2017/0017721 A1 | 1/2017 | Sauper et al. |
| 2018/0268439 A1* | 9/2018 | Avegliano .......... G06Q 30/0269 |
| 2018/0268440 A1* | 9/2018 | Avegliano .......... G06Q 30/0269 |

* cited by examiner

*Primary Examiner* — Satwant K Singh
(74) *Attorney, Agent, or Firm* — Griffiths & Seaton PLLC

(57) ABSTRACT

Embodiments for managing viewer engagement of online content by one or more processor are described. Content posted on an online channel is detected. A viewer engagement component associated with the content is received. A portion of the content is selected based on the received viewer engagement component. A signal representative of the selected portion of the content is generated.

15 Claims, 6 Drawing Sheets

METHODS AND SYSTEMS FOR ENHANCING VIEWER ENGAGEMENT WITH CONTENT PORTIONS

BACKGROUND OF THE INVENTION

Field of the Invention

The present invention relates in general to computing systems, and more particularly, to various embodiments for managing viewer engagement of online content with enhancement of content portions.

Description of the Related Art

When content (e.g., text-based, video, audio, etc.) is posted online (e.g., on a social media platform), viewers are often able to engage or interact with the content by, for example, posting comments, questions, and emoticons, which are often visible to the content creator and/or the other viewers via the online channel (e.g., in a pop-up window or a portion of the particular website that is dedicated to viewer engagement).

Using current systems, there is typically no way for the content creator and/or other viewers to know exactly which portion or aspect of the content is being referred to by some of the posted viewer engagement components (e.g., comments). For example, a comment that is posted regarding the content may seem to refer an object shown or a sound heard in the content. However, if there are multiple objects and/or sounds in the content, viewers of the comment may not be sure what the comment is referencing and/or may not be able to quickly and easily identify what is being referenced.

SUMMARY OF THE INVENTION

Various embodiments for managing viewer engagement of online content by one or more processor are described. In one embodiment, by way of example only, a method for managing viewer engagement of online content, again by one or more processors, is provided. Content posted on an online channel is detected. A viewer engagement component associated with the content is received. A portion of the content is selected based on the received viewer engagement component. A signal representative of the selected portion of the content is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
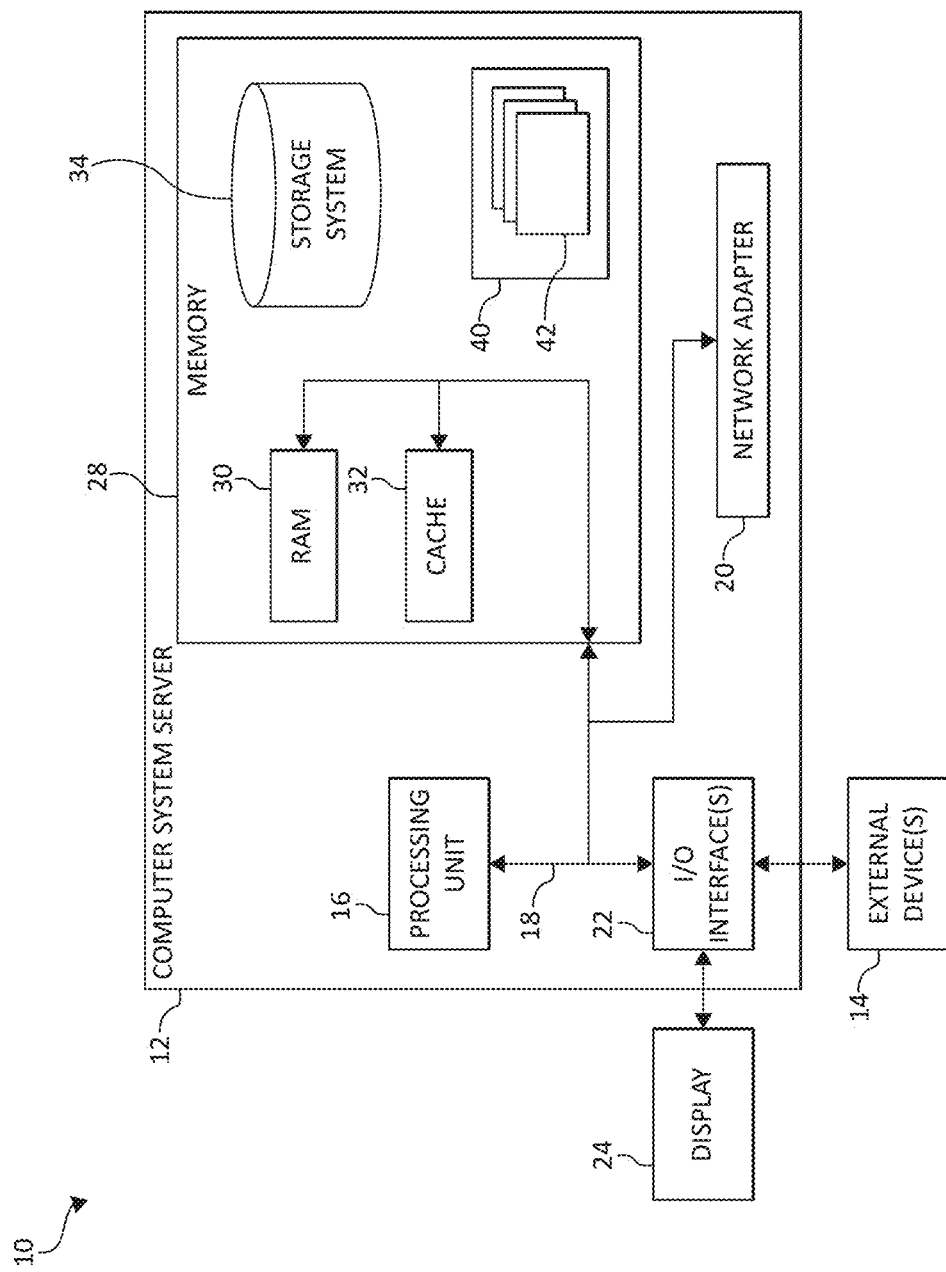
FIG. 1 is a block diagram depicting an exemplary computing node according to an embodiment of the present invention.

As discussed above, when content (e.g., text-based, video, audio, etc.) is posted online (e.g., on a social media platform, on a website, via a messaging application, etc.), viewers are often able to engage or interact with the content by, for example, posting comments, questions, and emoticons, which are often visible to the content creator and/or the other viewers via the online channel (e.g., in a pop-up window or a portion of the particular website that is dedicated to viewer engagement).

Using current systems, there is typically no way for the content creator and/or other viewers to know exactly which portion or aspect of the content is being referred to by some of the posted viewer engagement components (e.g., comments). For example, a comment that is posted regarding the content may seem to refer an object shown or a sound heard in the content. However, if there are multiple objects and/or sounds in the content, viewers of the comment may not be sure what the comment is referencing.

To address these needs, some embodiments described herein provide methods and systems that, for example, intelligently identify (e.g., based on contextual understanding of the viewer engagement and/or the content), extract and/or enhance appropriate written, audio, and/or video "snippets" (or content portions or aspects) from the original content and provide automatically generated annotations connected to viewer engagement components that reference the content portions. In addition, in some embodiments, the viewer engagement components (e.g., comments) may be categorized and/or organized based on the associated content portions, facilitating the review thereof (e.g., based on the subject(s) of the content portions).

As such, some embodiments described herein provides methods and systems for enhancing viewer engagement components with annotations of portions of the content to which the viewer engagement components are posted. The annotations may provide a "mapping" to the text, audio, or video portion(s) of the content (e.g., snippets) referenced by the viewer engagement components. The annotations may be shown as visual representations of the associated content portions (e.g., small images, icons, symbols, etc.). Users (e.g., the content creator, viewers, etc.) may be able to interact with the annotations to cause the associated portions of the content to be rendered (e.g., in addition to the original rendering of the content, perhaps in an isolated manner).

In some embodiments, content is posted on (or to) an online (e.g., Internet, web, etc.) channel, such as a social media platform, website, etc. The content may include text-based content (e.g., reading material), audio content, and/or video content. The online channel is configured in such a way to allow users (e.g., the content creator, other viewers, etc.) who view (e.g., those that are able/authorized to view) or consume the content to post (or create) viewer engagement components, such as comments and questions, associated with and/or related to the posted content (e.g., via a text box below the content).

In some embodiments, when a viewer engagement component, such as a comment, is received and/or if a comment is detected as being created or composed, the system (e.g., a centralized server, cognitive module, etc.) may analyze the comment (e.g., as the comment is being created and/or after the comment has been submitted) and/or the content to identify (e.g., via dynamic tagging and analysis of the posted content) appropriate snippets, portions, and/or aspects of the content, such as text, audio, video, image, etc. When such a portion of the posted content is identified, the content portion is "extracted" from the posted content and a "shortcut" to the content portion is created, perhaps in the form of a visual representation (e.g., an image, symbol, icon, etc.), and rendered along with the comment when the comment is posted to the online channel (e.g., next to the comment).

The analysis of the comment and/or the content may include a cognitive analysis. In some embodiments, region-based convolutional neural network (R-CNN) pixel mapping, natural language processing (NLP), and/or Mel-frequency cepstral coefficients (MFCCs), as are commonly understood, are used to identify the appropriate content portions and/or correlate the content portions to the viewer engagement components (or vice versa). In some embodiments, the content may include metadata and/or "tags," that may be created and/or added by, for example, the content creator and/or via a cognitive analysis, which may be used to correlate the content and/or portions thereof to viewer engagement components.

For example, consider an scenario in which a user (or content creator) has posted a video on a social media platform, and multiple viewers of the content (e.g., the user's "friends," contacts, etc.) have posted (or are posting) comments on the video. Some of the comments may be related to a song heard in the video, while others may be related to a person's laughing in the video and some of related to the appearance (e.g., clothes, pose, etc.) of a person in the video. In some embodiments, when such comments are posted, visual representations of the appropriate content portions of the video, which are "mapped" to the appropriate content portions, are rendered with the comments. In particular, if one of the comments is related to a person's laughing, the visual representation that is rendered may be in the form of a "sound wave" icon or symbol.

In some embodiments, users (e.g. the content creator, the viewer who posted the comment, or other viewers) may be able to interact with the visual representation to cause the appropriate content portion(s) to be rendered (e.g., in an isolated manner). For example, with respect to the example of a person's laugh described above, users may be able to select (e.g., "click on") the sound wave icon, which causes the appropriate content portion(s) to be rendered. For instance, the portion of the video (e.g., a 10 second portion) that includes the laughing may be played, or only the audio thereof (i.e., the audio associated with that portion of the video) may be rendered by the appropriate computing device (or node). Similarly, if the comment and/or the visual representation is associated with a visual portion or aspect of the content, selecting the visual representation may cause the appropriate portion of the video to be shown, or an image (e.g., a "screen shot") from the video may be rendered, which shows the appropriate subject(s), object(s), etc. (e.g., either as captured from the content video or a stock image pulled from another source).

In some embodiments, the viewer engagement components are aggregated (or categorized) based on the associated content portions. For example, if more than one comment is related to the person's laughing (i.e., the same content portion), those comments may be "bundled" such that they are rendered next to each other (e.g., near or next to the visual representation of the laughter). In particular, with respect the example of the video posted on the social media platform described above, assume that ten viewers have posted comments related to the laughing, five have posted comments related to the pose/posture of the content creator shown in the video, and fifteen have posted comments related to the content creator's facial expression. In such an instance, the comments may be grouped as such, along side or next to the appropriate visual representation of the associated content portion(s) (e.g., the fifteen comments related to the facial expression will be rendered in such a way to indicate that they are related to each other and associated with an appropriate visual representation), perhaps based on user preferences.

In some embodiments, the size (e.g., duration, length/width/height, etc.) of the selected content portion(s) is identified based on a contextual analysis of the viewer engagement component(s), as well as image/object recognition, audio content analysis, etc. of the content. In some embodiments, the user posting the viewer engagement component may be able to select from multiple content portions and/or select the size thereof (i.e., which is accordingly mapped to the rendered visual representation). For example, if the viewer engagement component is related to a walking style of an individual shown in a posted video, the user may be able to select a duration (e.g., 5 seconds, 10 seconds, etc.) of a portion of the video that shows the individual walking and/or select from multiple portions of the video that show the individual walking. Similarly, if the viewer engagement component is related to an automobile shown in the video, and more than one automobile is shown in the video, the user may be able to select from multiple video clips or images (e.g., captured from the video or stock images) that show the different automobiles.

In some embodiments, users are able to provide feedback regarding the selection of content portions of the posted content. For example, while the user is composing a comment that is determined to reference a subject or object in the content, the user may be presented with a "preview" of the associated content portion(s) (e.g., a rendering of the associated content portions). If the user decides that the selected content portion(s) are not related to their comment, the user may select to not have their comment associated with the select content portions (and thus not have their comment rendered next to a visual representation) and/or otherwise indicate that the selected content portion(s) are not related to their comment. Such feedback may be utilized by the system (e.g., via a cognitive analysis) such that the performance of the system is improved over time.

In some embodiments, a cognitive analysis may (also) be used to assist in the analysis of viewer engagement components and/or content via a cognitive profile that may be generated for respective users based on, for example, data sources associated with the user(s). Data sources that be use used to generate a cognitive profile for the user(s) may include any appropriate data sources associated with the user that are accessible by the system (perhaps with the permission or authorization of the user). Examples of such data sources include, but are not limited to, a profile of (or basic information about) the user (e.g., job title, place of work, length of time at current position, family role, etc.), a schedule or calendar (i.e., the items listed thereon, time frames, etc.), projects (e.g., past, current, or future work-related projects), electronic communications (e.g., email, text messages, etc.), social media activity (e.g., posts, reactions, comments, groups, etc.), browsing history (e.g., web pages visited), and online purchases.

The cognitive analysis may include classifying natural language, analyzing tone, and analyzing sentiment (e.g., scanning for keywords, key phrases, etc.) with respect to, for example, content, viewer engagement components, and data sources associated with the user(s). Over time, the methods and systems described herein may determine correlations (or insights) that allow for an improvement in the determining of the relevancy content portions to viewer engagement components, perhaps with feedback provided by the users, that allows for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the selecting of content portions based on viewer engagement components. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such an email application, social media application, a web browser, etc. In other words, as used herein, examples of computing nodes include, for example, computing devices such as mobile phones, tablet devices, desktop computers, or workstations that are owned and/or otherwise associated with individuals (or users), and/or various applications that are utilized by the individuals on such computing devices.

In particular, in some embodiments, a method for managing viewer engagement of online content by one or more processors is provided. Content posted on an online channel is detected. A viewer engagement component associated with the content is received. A portion of the content is selected based on the received viewer engagement component. A signal representative of the selected portion of the content is generated.

The selected portion of the content (e.g., only the selected portion of the content) may be caused to be rendered. A visual representation of the selected portion of the content may be caused to be rendered. The causing of (only) the selected portion of the content to be rendered may be performed in response to user interaction with the visual representation.

The selecting of the portion of the content may be performed utilizing a cognitive analysis of at least one of the content and the viewer engagement component. The selecting of the portion of the content may be performed utilizing at least one of region-based convolutional neural network (R-CNN) pixel mapping, natural language processing (NLP), and Mel-frequency cepstral coefficients (MFCCs).

The content may include at least one of text-based content, audio content, and video content. If the content includes at least one of audio content and video content, the content may have a first duration, and the selected portion of the content may have a second duration. The second duration may be less than the first duration.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
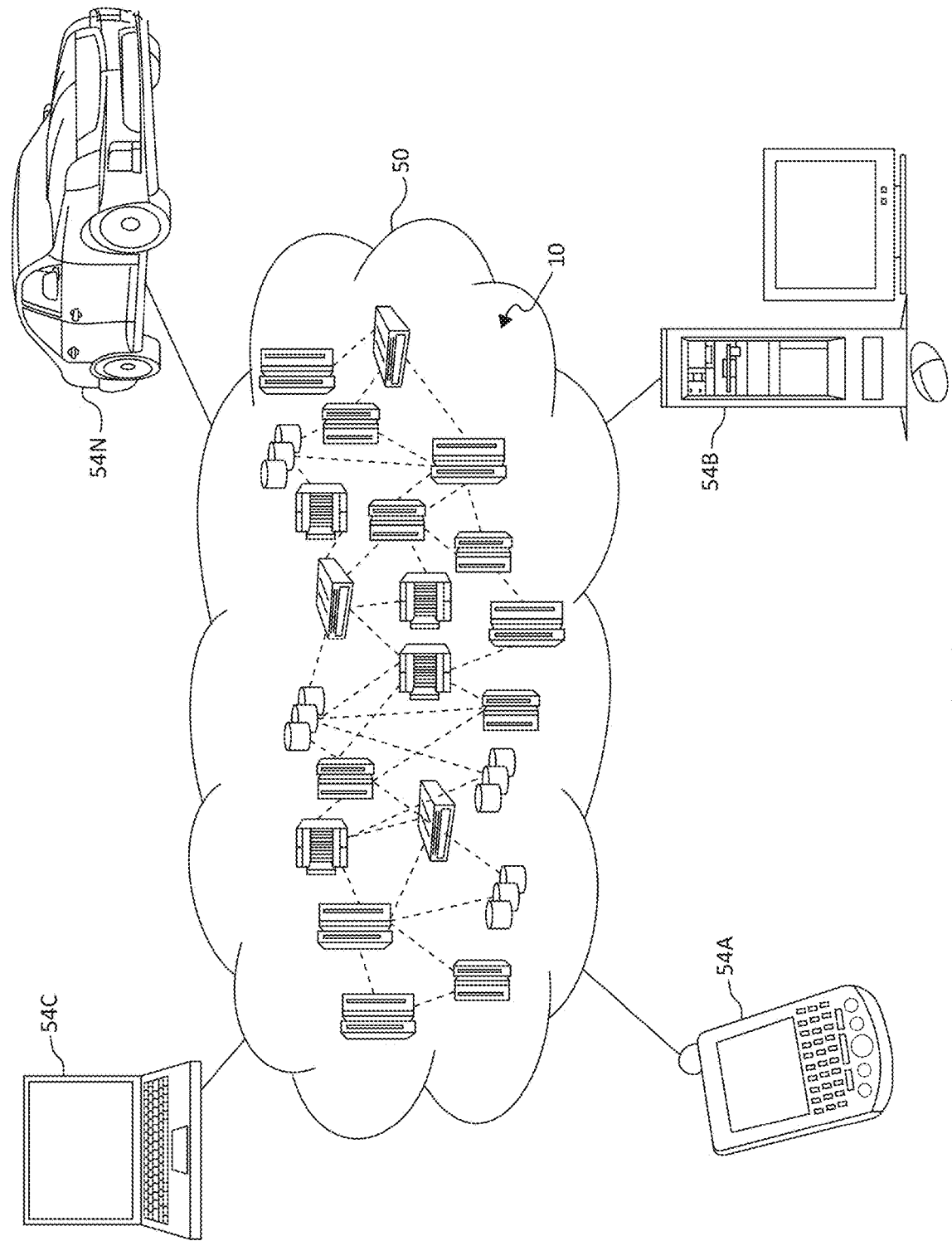
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, laptop computer 54C, and vehicular computing system (e.g., integrated within automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
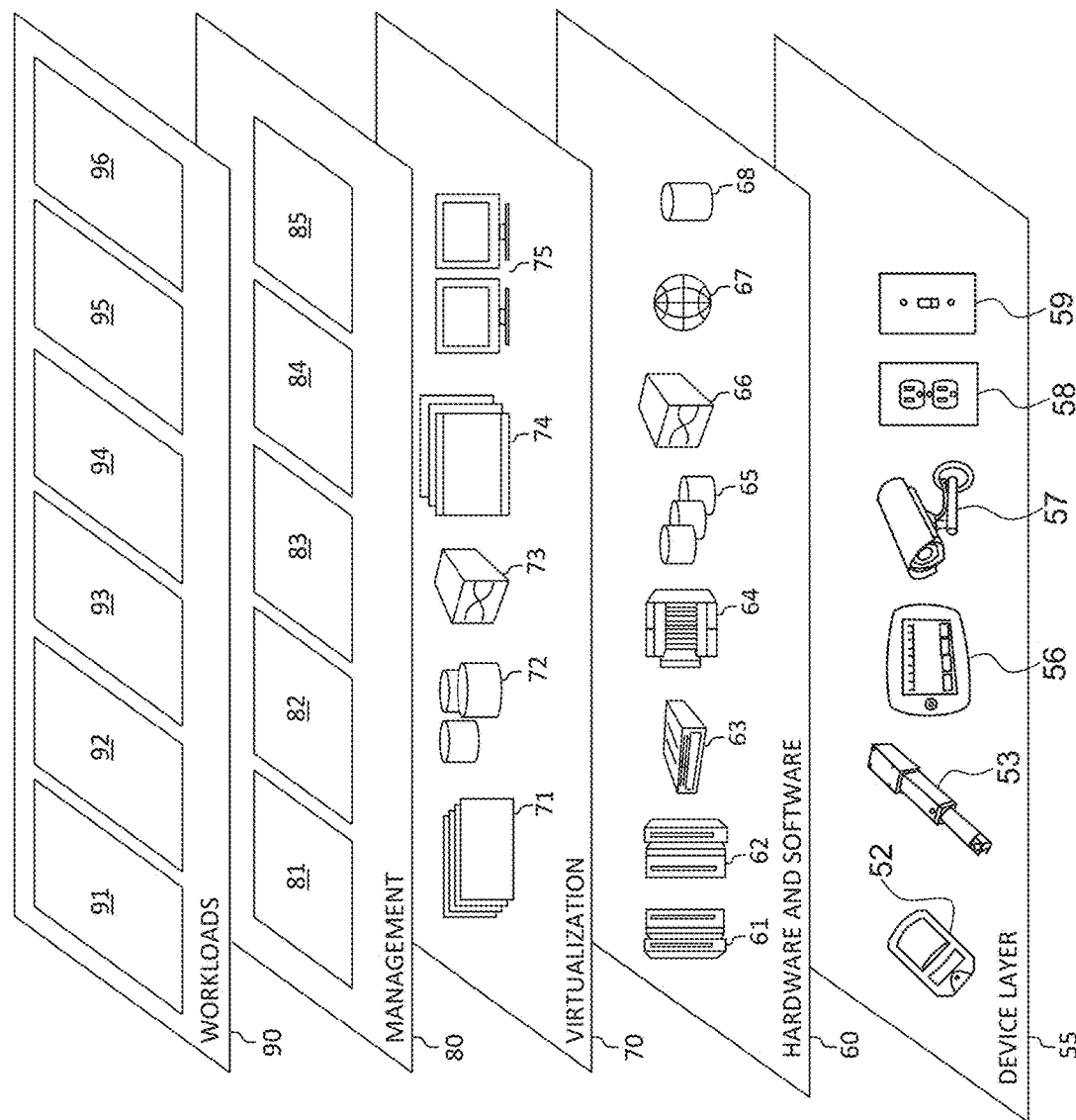
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for enhancing viewer engagement as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, when content (e.g., text based, audio, and/or video) is posted on (or to) an online channel (e.g., social media platform, etc.), the content is analyzed, perhaps in light of viewer engagement components (e.g., comments) submitted (or being generated for submission) to be posted to the content. The system may be able to analyze the content to, for example, identify and/or categorize objects in images or video frames, individuals, and/or sounds (e.g., types of sounds, voices, speech, etc.).

When a comment is submitted (or posted), or perhaps while the comment is being composed, a snippet (or portion) of the content is selected (and/or extracted) as being related to the comment, and a visual representation of the content portion is rendered along with the comment, which may be mapped to the appropriate content portion. Machine learning techniques, or a cognitive analysis, may be used by a correlation engine to correlate the portions of the content to the comments. In some embodiments, R-CNN pixel mapping, NLP (e.g., semantic key word analysis), and/or a MFCC algorithm are utilized.

Viewers of the content (e.g., the content creator, the viewer posting the comment, other viewers, etc.) may then be able to interact the visual representation, causing the appropriate content portion to be rendered (e.g., a sound from the content, an image from the content, a portion of video content, etc.).

In some embodiments, the viewer posting the comment is able to select from multiple content portions (e.g., while composing the comment or after composing the comment). For example, while composing (or writing, typing, dictating, etc.) the comment, the system may select multiple portions of the content which may be related to the comment, and cause a visual representation for each to be displayed. For example, if a viewer is composing (or has submitted) a comment regarding an individuals laugh in a video, and the video includes multiple instances of people laughing, the viewer may be presented with multiple visual representations, each being associated with and/or mapped to a respective one of the instances of the laughing. The viewer may cause the respective content portions associated with each of the visual representations to be rendered (e.g., by clicking on them, "mousing over" them, etc.) and then select the instance to which they are referring. Digital signal processing may be used to recognize or identify different sounds (e.g., in audio and/or video content), and text analysis (e.g., NLP) may be used to identify tone, sentiment, mood, etc. (e.g., in text-based content or viewer engagement components). Information regarding the content portions selected by users may be stored and later used to improve the performance of the system.

In some embodiments, the size (e.g., duration, length/width/height, etc.) of the selected content portion(s) is identified based on a contextual analysis of the viewer engagement component(s), as well as image/object recognition, audio content analysis, etc. of the content. In some embodiments, the user posting the viewer engagement component may be able to select from multiple content portions and/or select the size thereof (i.e., which is accordingly mapped to the rendered visual representation). In some embodiments, historical learning may be used to select the size of the selected portions of the content.

In some embodiments, the viewer engagement components are aggregated (or categorized) based on the associated content portions. For example, if more than one comment is related to a particular subject, object, etc. within the posted content, those comments may be "bundled" such that they are rendered next to each other (e.g., near or next to the visual representation of the laughter). This may assist in viewers in consuming the viewer engagement components and/or the associated content portions in an efficient manner.

Figure 4:
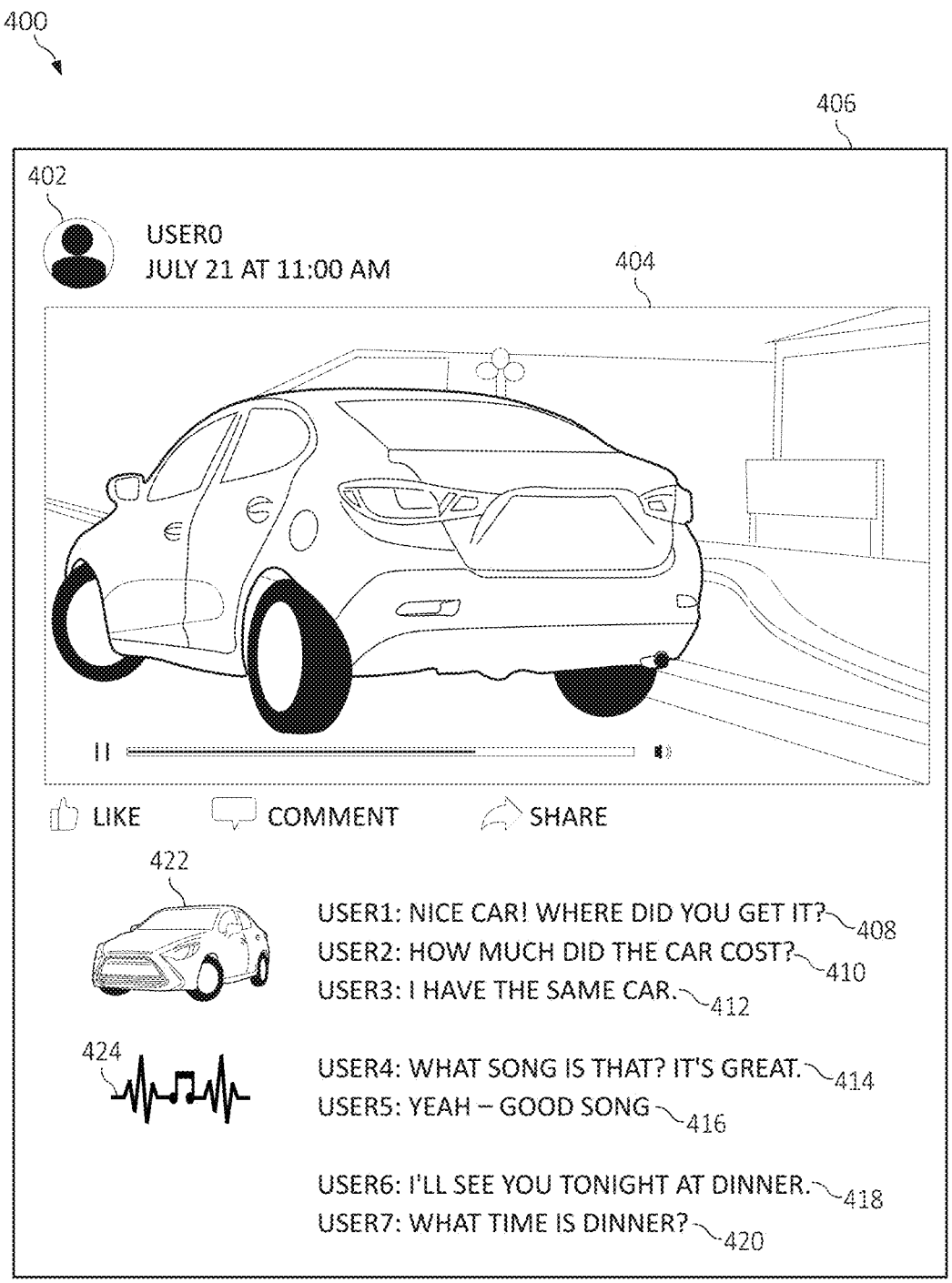
FIG. 4 is a plan view of a computing environment window displaying content posted to an online channel according to an embodiment of the present invention.

FIG. 4 illustrates an exemplary computing environment window 400 according to some embodiments of the present invention. The window 400 may be rendered by any suitable computing node (and/or a display device thereof), such as those described above. In some embodiments, the window 400 is used to display content that is posted online, such as on a social media platform, website, messaging application, or any other suitable online channel. In the depicted embodiment, the window includes an information panel 402, a content panel 404, and a viewer engagement panel 406.

The information panel 402 may indicate the name (or user name) of the individual, group of individuals, organization, etc. (e.g., USER0) that has created or posted the displayed content (e.g., the content creator), along with other information, such as the date and time at which the post was created. The content panel 404 may be used to display (or render) the posted content (or media). In the depicted embodiment, the content includes a video (e.g., with sound/audio). However, it should be understood that other types of content may be posted, such a text-based content (or reading material), audio files (e.g., audio only files), images, etc. The viewer engagement panel 406 may be used to display viewer engagement components, such as comments, created (or posted or submitted) by viewers of the content (e.g., any user with access to the respective online channel who is able to view or consume the content posted in the window 400).

In the depicted embodiment, viewer engagement components (e.g., comments) 408-420 have been respectively posted (or created or submitted) by seven viewers (e.g., USER1-USER7) and rendered within the viewer engagement panel 406, along with visual representations 422 and 424. As described above, when a comment (or other viewer engagement component) is received and/or detected as being generated, the comment is analyzed, along with the content for which the comment is being generated, to determine which (if any) portions (or aspects) of the content are related to the comment. When the comment is posted, a visual representation (e.g., an image, symbol, etc.) of the appropriate content portion(s) is rendered along with the comment.

In the depicted embodiment, comments 408, 410, and 412 have been determined to be related to an automobile (or car) shown in video rendered in the content panel 404. As such, visual representation 422, which in the depicted embodiment is an image of an automobile (e.g., the same automobile in the content), is rendered near (e.g., next to) comments 408, 410, and 412. Similarly, comments 414 and 416 have been determined to be related to a song that is played in the video. As such, visual representation 424, which in the depicted embodiment in a sound wave and/or song symbol/icon, is rendered near comments 414 and 416.

In some embodiments, the viewers (e.g., the content creator, viewers posting comments, etc.) may interact with the visual representations of the content portions to cause the related portion(s) of the content to be rendered. This rendering of the selected portions of the content may be in addition to a "primary" rendering of the content (e.g., initiated by the viewer viewing the content for the first time). For example, still referring to FIG. 4, a viewer may interact with (or select) visual representation 422, such as via a cursor, mouse, keyboard, etc., which may cause, for example, the video posted in the content panel 404 to "jump" to the portion(s) (or time frame(s)) of the video in which the automobile is shown (e.g., a 5 or 10 second portion of the video where the automobile is shown). Alternatively, selecting visual representation 422 may cause an image of the automobile to be rendered, such as in the content panel 404 of the window 400 or another window (e.g., a pop-up window). The rendered image may be captured from the video or may be another image of the same type of automobile (e.g., retrieved from another data source, such as the website of the automobile manufacturer). As such, the selected portion(s) of the content that are rendered in response to the viewer interacting with the visual representation may be "smaller" than the posted content as a whole (e.g., a relatively short clip of a posted video or audio file, an image captured from a video, etc.).

Similarly, if a viewer interacts with visual representation 424, the video may jump to the portion(s) of the video in which the song is played. Alternatively, only the audio content from those portion(s) of the video may be rendered by the viewer's computing device, or perhaps the song may be retrieved (and/or streamed from) another data source and played in its entirety.

In some embodiments, the rendering of the appropriate content portion(s) is enhanced to allow the viewer to focus on the related portions or aspects of the posted content. For example, if the comment is related an automobile shown in a posted video, and the automobile have a relatively small apparent size in the video (e.g., the automobile was a significant distance away from the camera used to record the video), the appropriate portion of the video may be "zoomed in" when the rendering of the appropriate portion(s) of the video are rendered after visual representation 422 is selected by a viewer. Similarly, if the selected portions of the content are related to audio (e.g., songs, voices, etc.), the audio may be filtered to allow viewers to more clearly hear the appropriate sounds.

In some embodiments, the selected portions of the content may be saved or stored by viewers and used or posted elsewhere. For example, a viewer may "right click" on visual representation 424, which may cause a pop-up menu to appear that includes a "copy" function. The viewer may then post (or "paste") the associated portion(s) of the content (perhaps along with the visual representation 424) in a new post on the online channel and/or as a viewer engagement component in another post. Other viewers may then be able to consume the associated content portion(s) in the same manner.

Still referring to FIG. 4, the organization of the comments 408-420 should be noted. In particular, comments 408, 410, and 412, which are related to the automobile shown in the video, are rendered in a "grouped" (or bundled) manner next to visual representation 422, which is the visual representation associated with the portion(s) of the video in which the automobile is shown. Similarly, comments 414 and 416, which are related to the song in the video, are rendered in a grouped manner next to visual representation 424, which is the visual representation associated with the portion(s) of the video in which the song is played.

Further, it should be noted that comments 418 and 420 are rendered in a grouped manner but not next to any visual representation. This may be the case because comments 418 and 420 have been determined to be associated with a subject (e.g., a dinner meeting/event) that is not related to any portions, subjects, etc. of the posted content. As such, in some embodiments, viewer engagement components that are determined to be unrelated to the posted content may be rendered without the enhancements described herein. Additionally, in some embodiments, even if a viewer engagement component is determined to be associated with a portions of the posted content, the viewer (e.g., the individual creating the viewer engagement component) may be able to disable the enhancements described herein.

Figure 5:
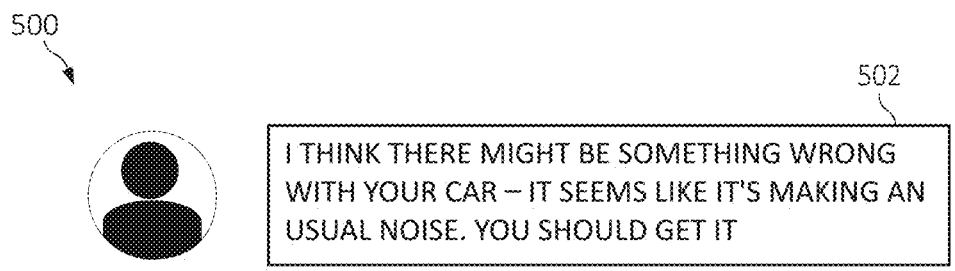
FIGS. 5 and 6 are plan views of a user interface for composing viewer engagement components according to an embodiment of the present invention.
Figure 6:
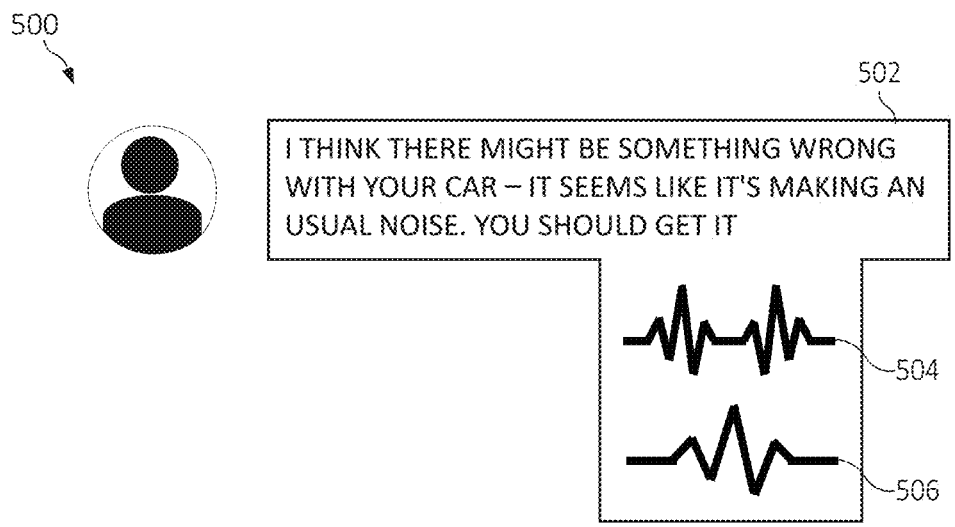

FIGS. 5 and 6 illustrate a user interface 500 which may be used by viewers to create (or post or submit) viewer engagement components according to some embodiments described herein. The user interface 500 includes a text box 502, which may be used (e.g., via a mouse, keyboard, microphone, etc.) by a viewer to compose and/or submit a comment(s). The user interface 500 may be utilized in (e.g., at the bottom of) a computing environment window, similar to that shown in FIG. 4.

Referring specifically to FIG. 5, the user interface 500 is shown while a viewer is composing a comment within the text box 502. As described above, in some embodiments, while the comment (or other viewer engagement component) is being composed (and/or after it is composed), the comment (and/or the content to/on which the comment will be posted) is analyzed to determine if it is related to (or associated with) any subjects, aspects, objects, etc. of the content (and/or portions of the content).

Referring now to FIG. 6, in some embodiments, if the comment (either while being composed or after it is composed and/or submitted) is determined to be related to more than one portion of the content, multiple visual representations, each being associated with respective portions of the content, are rendered. In the example shown in FIGS. 5 and 6, the comment is related to the noise (or sound) being made by an automobile (e.g., within video (or audio) content such as that described above with respect to FIG. 4). Using such an example, it should be assumed that the video includes more than one noise apparently made by an automobile. As such, two visual representations 504 and 506, both in the form of sound wave symbols, are rendered (e.g., within an expanded portion of the text box 502, below the text of the comment). In some embodiments, the viewer may select one of the visual representations 504 and 506 (e.g., via a cursor, mouse, keyboard, etc.) which results in the selected visual representation being rendered near (or otherwise associated with) the comment when rendered or posted (e.g., within the viewer engagement window 406 shown in FIG. 4).

In such embodiments, the viewer (or individual composing/creating the comment) may be able to "preview" the content portions associated with the visual representations 504 and 506 (e.g., by mousing over, clicking on, etc.) before the comment is submitted and/or posted. For example, the viewer may be able to mouse over each of the visual representations which may cause, for example, the appropriate portions of the video or just the related audio thereof to be rendered by their respective computing device.

Figure 7:
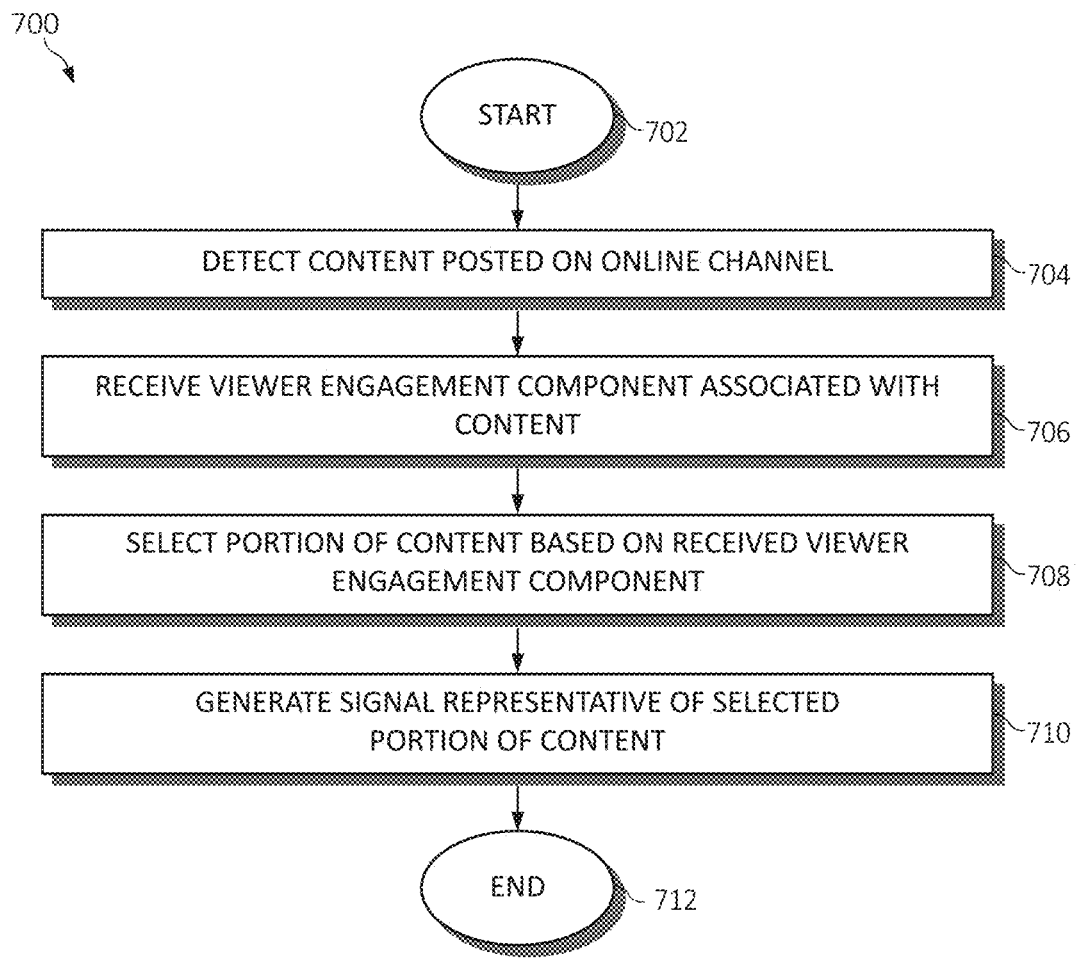
FIG. 7 is a flowchart diagram of an exemplary method for managing viewer engagement of online content according to an embodiment of the present invention.

Turning to FIG. 7, a flowchart diagram of an exemplary method 700 for managing viewer engagement of online content, in accordance with various aspects of the present invention, is provided. Method 700 begins (step 702) with, for example, content being posted on an online channel, such as on a social media platform, a website, through a messaging application, etc.

The content posted on the online channel is detected (step 704). The content may include at least one of text-based content, audio content, and video content.

A viewer engagement component associated with the content is received (step 706). The viewer engagement component may include a text-based (i.e., alphanumeric) comment (or question) that is posted in a manner associated with the content through the online channel on which the content is posted.

A portion of the content is selected based on the received viewer engagement component (step 708). The selecting of the portion of the content may be performed utilizing a cognitive analysis of at least one of the content and the viewer engagement component. The selecting of the portion of the content may be performed utilizing at least one of R-CNN pixel mapping, NLP, and MFCCs. If the content includes at least one of audio content and video content, the content may have a first duration, and the selected portion of the content may have a second duration. The second duration may be less than the first duration.

A signal representative of the selected portion of the content is generated (step 710). The generated signal may cause (or include) a rendering of a visual representation of the selected portion of the content.

Method 600 ends (step 612) with, for example, the selected portion of the content (e.g., only the selected portion of the content) being rendered. The causing of (only) the selected portion of the content to be rendered may be performed in response to user interaction with the visual representation. The process may be repeated for subsequent viewer engagement components that are associated with the content posted on the online channel.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing viewer engagement of online content comprising:
   detecting content posted on an online channel; wherein the content includes at least one of audio content and video content and has a first duration;
   receiving a viewer engagement component associated with the content;
   selecting a portion of the content based on the received viewer engagement component wherein the selected portion of the content has a second duration, the second duration being less than the first duration; and
   generating a signal representative of the selected portion of the content.

2. The method of claim 1, further comprising causing only the selected portion of the content to be rendered.

3. The method of claim 2, further comprising causing a visual representation of the selected portion of the content to be rendered, wherein the causing of only the selected portion of the content to be rendered is performed in response to user interaction with the visual representation.

4. The method of claim 1, wherein the selecting of the portion of the content is performed utilizing a cognitive analysis of at least one of the content and the viewer engagement component.

5. The method of claim 1, wherein the selecting of the portion of the content is performed utilizing at least one of region-based convolutional neural network (R-CNN) pixel mapping, natural language processing (NLP), and Mel-frequency cepstral coefficients (MFCCs).

6. A system for managing viewer engagement of online content comprising:
   at least one processor that
      detects content posted on an online channel; wherein the content includes at least one of audio content and video content and has a first duration;
      receives a viewer engagement component associated with the content;
      selects a portion of the content based on the received viewer engagement component wherein the selected portion of the content has a second duration, the second duration being less than the first duration; and
      generates a signal representative of the selected portion of the content.

7. The system of claim 6, wherein the at least one processor further causes only the selected portion of the content to be rendered.

8. The system of claim 7, wherein the at least one processor further causes a visual representation of the selected portion of the content to be rendered, wherein the causing of only the selected portion of the content to be rendered is performed in response to user interaction with the visual representation.

9. The system of claim 6, wherein the selecting of the portion of the content is performed utilizing a cognitive analysis of at least one of the content and the viewer engagement component.

10. The system of claim 6, wherein the selecting of the portion of the content is performed utilizing at least one of region-based convolutional neural network (R-CNN) pixel mapping, natural language processing (NLP), and Mel-frequency cepstral coefficients (MFCCs).

11. A computer program product for managing viewer engagement of online content by one or more processors, the computer program product comprising a non-transitory computer-readable storage medium having computer-readable program code portions stored therein, the computer-readable program code portions comprising:
   an executable portion that detects content posted on an online channel; wherein the content includes at least one of audio content and video content and has a first duration;
   an executable portion that receives a viewer engagement component associated with the content;
   an executable portion that selects a portion of the content based on the received viewer engagement component wherein the selected portion of the content has a second duration, the second duration being less than the first duration; and
   an executable portion that generates a signal representative of the selected portion of the content.

12. The computer program product of claim 11, wherein the computer-readable program code portions further include an executable portion that causes only the selected portion of the content to be rendered.

13. The computer program product of claim 12, wherein the computer-readable program code portions further include an executable portion that causes a visual representation of the selected portion of the content to be rendered, wherein the causing of only the selected portion of the content to be rendered is performed in response to user interaction with the visual representation.

14. The computer program product of claim 11, wherein the selecting of the portion of the content is performed utilizing a cognitive analysis of at least one of the content and the viewer engagement component.

15. The computer program product of claim 11, wherein the selecting of the portion of the content is performed utilizing at least one of region-based convolutional neural network (R-CNN) pixel mapping, natural language processing (NLP), and Mel-frequency cepstral coefficients (MFCCs).

* * * * *